US010225505B2

(12) United States Patent
Guicquero et al.

(10) Patent No.: US 10,225,505 B2
(45) Date of Patent: Mar. 5, 2019

(54) ELECTRONIC DEVICE FOR ANALYZING A SCENE

(71) Applicant: Commissariat à l'Energie Atomique et aux Energies Alternatives, Paris (FR)

(72) Inventors: William Guicquero, Bur-sur-Yvette (FR); Arnaud Verdant, Saint-Nazaire-les-Eymes (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/727,611

(22) Filed: Oct. 8, 2017

(65) Prior Publication Data

US 2018/0103225 A1 Apr. 12, 2018

(30) Foreign Application Priority Data

Oct. 11, 2016 (FR) .................................... 16 59807
Oct. 6, 2017 (EP) .................................... 17195193

(51) Int. Cl.
H04N 5/376 (2011.01)
H04N 5/378 (2011.01)
(Continued)

(52) U.S. Cl.
CPC ........... *H04N 5/378* (2013.01); *H04N 5/3745* (2013.01); *H04N 5/3765* (2013.01)

(58) Field of Classification Search
CPC ..... H04N 5/378; H04N 5/3765; H04N 5/3745
See application file for complete search history.

(56) References Cited

U.S. PATENT DOCUMENTS 8,760,147 B2 * 6/2014 Lotto ........................ G01T 1/17
250/222.2
9,967,479 B2 * 5/2018 Matolin ................. H04N 3/155
(Continued)

FOREIGN PATENT DOCUMENTS

EP 2933995 A1 10/2015
WO 2008061268 A1 5/2008
(Continued)

OTHER PUBLICATIONS

C. Posch, Retinomorphic Event-Based Vision Sensors: Bioinspired Cameras With Spiking Output, Proceedings of the IEEE, vol. 102, No. 10, Oct. 1, 2014, pp. 1470-1484.
(Continued)

Primary Examiner — Hung H Lam
(74) Attorney, Agent, or Firm — Moreno IP Law LLC

(57) ABSTRACT

The invention relates to an electronic device for analyzing a scene, including a plurality of pixels (101) connected to a readout circuit (103) by a same first conductive track (105), wherein: each pixel (101) is capable of detecting an occurrence of a first event characteristic of the scene and of transmitting an event indication signal on the first conductive track (105) when it detects an occurrence of the first event; and the readout circuit (103) is capable of reading from the first conductive track (105) the event indication signals transmitted by the pixels (101) and of deducing therefrom characteristics of the scene, without transmitting event acknowledgement signals to the pixels (101).

20 Claims, 6 Drawing Sheets

(51) Int. Cl.
*H04N 5/3745* (2011.01)
*H04N 5/374* (2011.01)

(56) References Cited

U.S. PATENT DOCUMENTS

2003/0218118 A1* 11/2003 Kramer .................. H04N 3/155
  250/214.1
2010/0051786 A1* 3/2010 Lotto ................. H04N 5/35509
  250/214 A

FOREIGN PATENT DOCUMENTS

WO 2013093378 A1 6/2013
WO 2015192062 A1 12/2015

OTHER PUBLICATIONS

Preliminary Seach Report, French Patent Application No. 1659807, dated Jul. 10, 2017, 3 pages.

\* cited by examiner

ELECTRONIC DEVICE FOR ANALYZING A SCENE

FIELD

The present application relates to an electronic device for analyzing a scene, and more particularly aims at a device of acquisition of a signal representative of optical characteristics of a scene.

BACKGROUND

It is known to acquire an image of a scene by means of an image sensor comprising a plurality of identical or similar pixels (or elementary cells), for example arranged in an array of rows and columns. Each pixel for example comprises a photodiode having its capacitance discharged by a photocurrent according to a received light intensity. Conventionally, during an image acquisition phase, each pixel is first reset by recharging of its photodiode to a reset voltage. The photodiode is then isolated from the node of application of the reset voltage, and the voltage across the photodiode decreases according to the light intensity received by the pixel. After a predetermined integration period identical for all the sensor pixels, each pixel delivers an analog output signal representative of the voltage across its photodiode. This signal is digitized by an analog-to-digital conversion circuit, and forms the output value of the pixel. The output values of the sensor pixels altogether form an image of the scene.

To overcome certain disadvantages of conventional image sensors, especially in terms of dynamic range, of signal-to-noise ratio, and/or of power consumption, time code image sensors have been provided, where each pixel comprises a comparator comparing the voltage across the photodiode with a reference voltage. During an image acquisition phase, each pixel is first reset by recharging of its photodiode to a reset voltage. The photodiode of each pixel is then isolated from the node of application of the reset voltage, and the voltage across the photodiode varies according to the light intensity received by the pixel. When the voltage across the photodiode of a pixel reaches the reference voltage, the comparator output switches state. The pixel is said to turn on. The pixel then signals its position to a readout circuit external to the pixel, according to an asynchronous communication protocol of "handshake" type, comprising the transmission, by the pixel, of an address readout request signal addressed to the readout circuit, followed by the transmission, by the readout circuit, of an acknowledgement signal addressed to the pixel, and then by the transmission, by the pixel, of an address indication signal addressed to the readout circuit. The time of reading of the pixel address by the readout circuit is stored and forms the pixel output value. When a plurality of pixels simultaneously turn on, an arbitration may be performed by the readout circuit, to set the pixel readout order. A disadvantage of this type of sensors is linked to the complexity and to the bulk of the asynchronous communication circuits provided to enable each pixel, when it turns on, to signal its position to the readout circuit. Further, due to the use of a "handshake"-type asynchronous communication protocol, variable delays may occur between the effective turn-on time of a pixel and the time of reception of the pixel address by the readout circuit. This may cause parasitic artifacts in the image and/or information losses, for example, when a high number of pixels of the sensor turn on simultaneously or within a short time interval.

SUMMARY

Thus, an embodiment provides an electronic device for analyzing a scene, comprising a plurality of pixels connected to a readout circuit by a same first conductive track, wherein:

each pixel is capable of detecting an occurrence of a first event characteristic of the scene and of transmitting an event indication signal on the first conductive track when it detects an occurrence of the first event; and the readout circuit is capable of reading from the first conductive track the event indication signals transmitted by the pixels, and of deducing therefrom characteristics of the scene, without transmitting event acknowledgement signals to the pixels, and wherein each pixel further comprises a first synchronization node, each pixel being configured to, when it detects an occurrence of the first event, wait to receive a synchronization signal on its first synchronization node to transmit the event indication signal on the first conductive track, or transmit a synchronization signal via its first synchronization node before transmitting the event indication signal on the first conductive track.

According to an embodiment, the pixels are connected to the readout circuit by a second conductive track, via their first synchronization node.

According to an embodiment, each pixel is capable, when it detects an occurrence of the first event, of:

transmitting the synchronization signal on the second conductive track; and then after a predetermined time interval, transmitting the event indication signal on the first conductive track.

According to an embodiment, the duration of the synchronization signal is shorter than the duration of the event indication signals.

According to an embodiment, the synchronization signals are read by the readout circuit from the second conductive track and are used by the readout circuit to synchronize operations of decoding of the event indication signals read from the first conductive track.

According to an embodiment, the readout circuit is capable of applying on the second conductive track the synchronization signal in the form of a succession of synchronization edges, and wherein each pixel is capable, when it detects an occurrence of the first event, of waiting for a next synchronization edge of the synchronization signal and then, on reception of this edge, of transmitting the event indication signal on the first conductive track.

According to an embodiment, each pixel further comprises a second synchronization node, the pixels being connected in a chain closed by their first and second synchronization nodes, the pixels being capable of circulating the synchronization signal in the form of a synchronization token in the chain during a phase of analysis of a scene, so that, at any time, a single pixel of the chain is in possession of the synchronization token.

According to an embodiment, each pixel is capable, when it detects an occurrence of the first event, of waiting to receive the synchronization token, and then, on reception of the token, of transmitting the event indication signal on the first conductive track.

According to an embodiment, the starting of the circulation of the token in the pixel chain during an analysis phase is triggered by the detection of a first event by a pixel of the device.

According to an embodiment, the readout circuit is capable, based on the signal read from the first conductive track, of detecting all the events signaled by the pixels, including when a plurality of pixels simultaneously transmit an event indication signal on the first conductive track.

According to an embodiment, different pixels are capable of transmitting on the first conductive track current or voltage event indication signals having different shapes when they detect an occurrence of the first event.

According to an embodiment, the readout circuit is capable of analyzing the shapes of the event indication signals read from the first conductive track, and of deducing therefrom the positions of the pixels having transmitted these signals to reconstruct an image of the scene.

According to an embodiment, the event indication signals transmitted on the first conductive track by the different pixels when they detect an occurrence of the first event are current signals having the same shape.

According to an embodiment, the device comprises pixels of different natures capable of detecting events of different natures, the event indication signals transmitted by the pixels having the same shape for pixels of same nature and different shapes for pixels of different natures.

According to an embodiment, the readout circuit is capable of counting the event indication signals read from the first conductive track during predetermined time periods of an analysis phase, to construct a histogram characteristic of the scene.

According to an embodiment, each pixel is further capable of detecting an occurrence of a second event characteristic of the scene and, when it detects an occurrence of the second event, of transmitting on the first conductive track an event indication signal different from the event indication signal that it transmits when it detects an occurrence of the first event.

Another embodiment provides an electronic device for analyzing a scene, comprising a plurality of pixels connected to a readout circuit by a same first conductive track, wherein:

each pixel is capable of detecting an occurrence of a first event characteristic of the scene and of transmitting an event indication signal on the first conductive track when it detects an occurrence of the first event; and the readout circuit is capable of reading from the first conductive track the event indication signals transmitted by the pixels, and of deducing therefrom characteristics of the scene, without transmitting event acknowledgement signals to the pixels, and wherein the readout circuit is capable, based on the signal read from the first conductive track, of detecting all the events signaled by the pixels, including when a plurality of pixels simultaneously transmit an event indication signal on the first conductive track.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION OF THE PRESENT EMBODIMENTS

Figure 1:
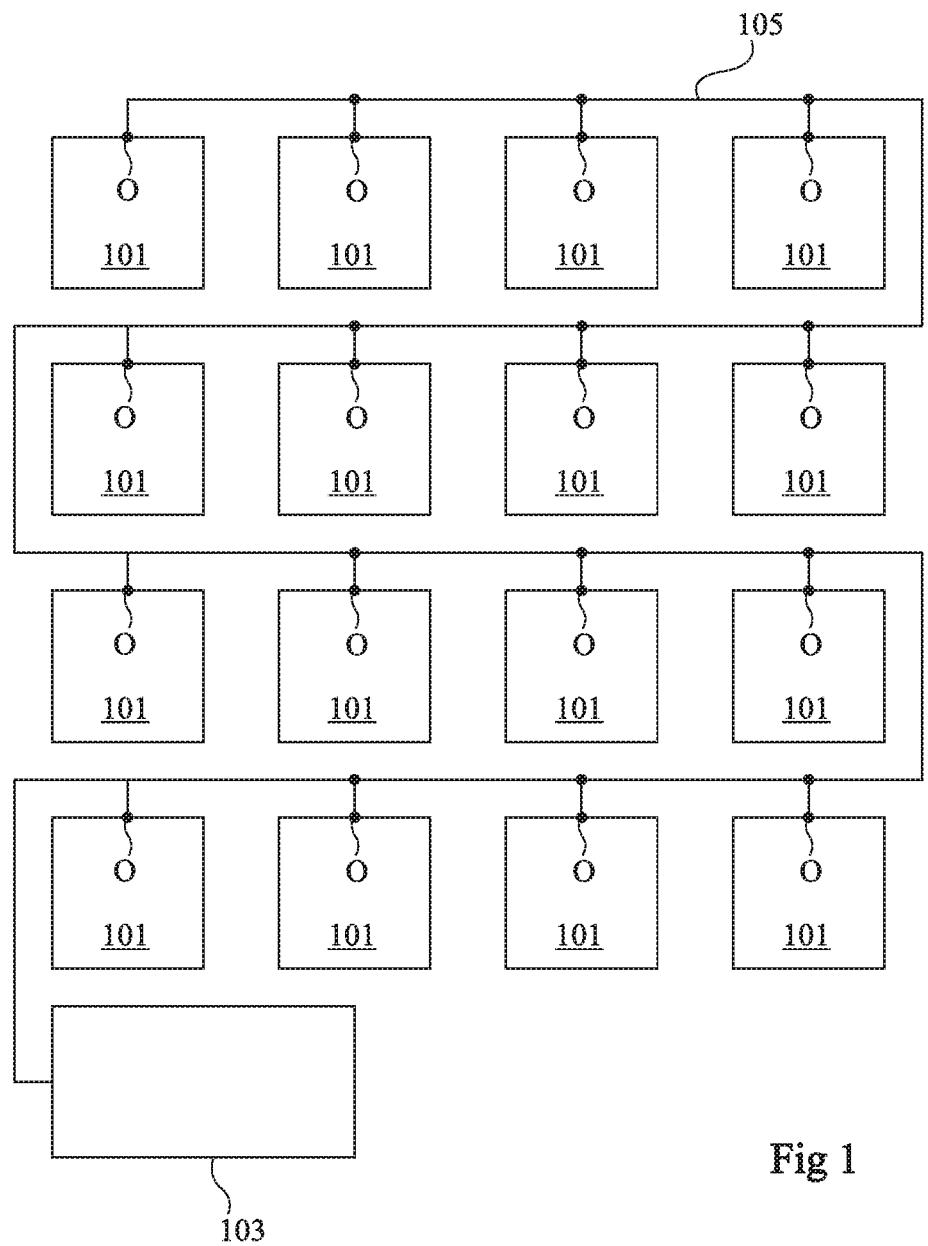
FIG. 1 is a simplified electric diagram of an example of an electronic device for analyzing a scene according to a first embodiment.

The same elements have been designated with the same reference numerals in the different drawings and, further, the various drawings are not to scale. For clarity, only those elements which are useful to the understanding of the described embodiments have been shown and are detailed. In particular, the forming of the pixels and of the readout circuits of the described analysis devices has not been detailed, the details of the forming of such elements being within the abilities of those skilled in the art based on the functional indications provided in the present description. Unless otherwise specified, expressions "approximately", "substantially", and "in the order of" mean to within 10%, preferably to within 5%.

FIG. 1 is a simplified electric diagram of an example of an electronic device for analyzing a scene according to a first embodiment. The device of FIG. 1 comprises a plurality of pixels 101, for example, identical or similar, and a readout circuit 103. In the shown example, the analysis device comprises an array of 4×4 pixels 101. The described embodiments are of course not limited to this specific example. Pixels 101 are connected to readout circuit 103 by a same conductive track 105. Each pixel 101 comprises a photodetector (not shown), for example, a photodiode, capable of supplying an electric signal representative of an illumination level received by the pixel. Each pixel 101 is capable of detecting an occurrence of an event characteristic of an optical property of the scene and of transmitting an event indication signal on conductive track 105 when it detects an occurrence of the event. Event here means the passing of a quantity characteristic of the scene above or under a threshold. As an example, each pixel may be adapted to detecting the passing of a threshold for the voltage across its photodiode during a phase of pixel integration (or pixel turning-on) and/or the passing of a threshold of time difference between the time taken by the pixel to turn on during an integration phase and the time taken by the same pixel to turn on during a previous integration phase, and/or the passing of a threshold of time difference between the time taken by the pixel to turn on and the time taken by another pixel of the device to turn on during a same integration phase, and/or the passing of a threshold of a number of occurrences of a certain type of event. In the shown example, each pixel 101 comprises an output node o connected to conductive track 105, and is capable, when it detects an occurrence of the event that it monitors, of applying an event indication signal to its node o.

According to an aspect of the described embodiments, readout circuit 103 is capable of generating a signal representative of characteristics of the scene based on the event indication signals read from conductive track 105, without transmitting event acknowledgement signals towards pixels 101. In other words, the analysis device does not implement a "handshake"-type request-acknowledgement mechanism during the evacuation of the data acquired by the pixels.

Figure 2:
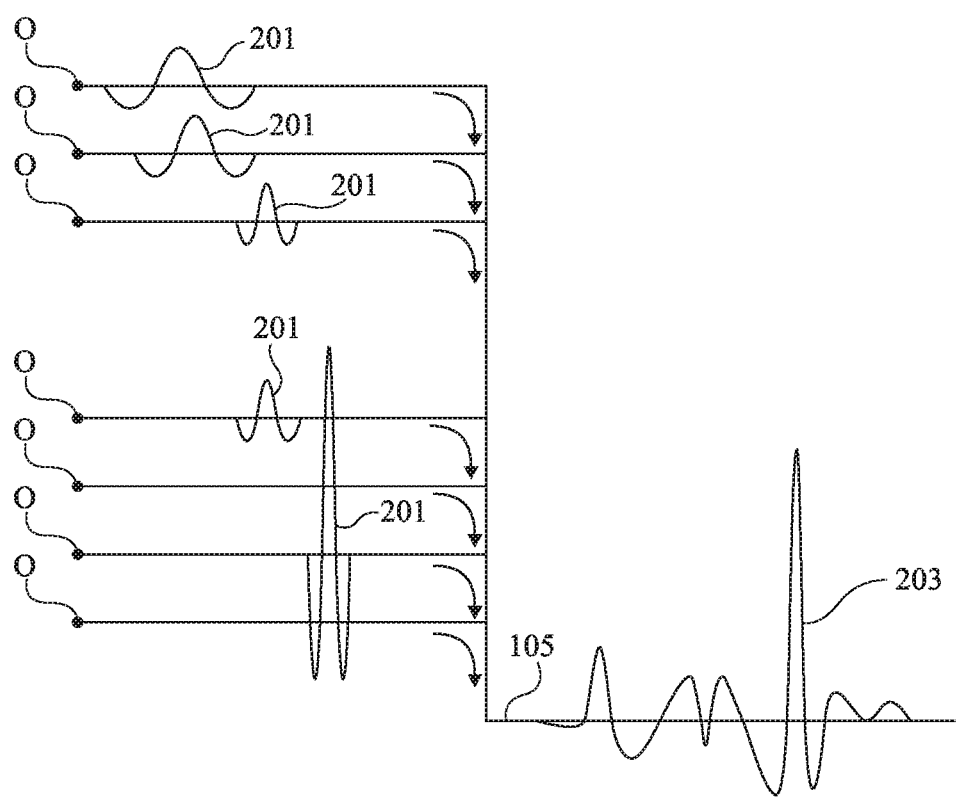
FIG. 2 schematically illustrates an example of an operating mode of the device of FIG. 1.

FIG. 2 schematically illustrates an example of an operating mode of the device of FIG. 1. FIG. 2 shows, arranged in a column, the output nodes o of the different pixels 101 of the device, and conductive track 105 connecting pixels 101 to readout circuit 103 of the device.

As an example, all pixels 101 monitor a same type of event, for example, the passing of a same threshold for the voltage across their photodiode. During a phase of analysis of the scene, all pixels 101 are for example reset and then integrated at the same time. When a pixel 101 detects an occurrence of the event that it monitors, it applies to its output node o an event indication signal 201, for example, a current, voltage, or charge pulse.

According to a first example of operation, the event indication signals 201 transmitted by the different pixels 101 on conductive track 105 have different shapes (or patterns). Readout circuit 103 can thus, when it receives an event indication signal via conductive track 105, determine the origin of this signal, that is, the position of the pixel having transmitted the signal. This operating mode enables readout circuit 103 to detect at any time the event signaled by the pixels, including when a plurality of pixels simultaneously signal event detections. The signals 201 transmitted by the different pixels 101 cumulate or superimpose on conductive track 105 to form a signal 203. Signal 203 is read by readout circuit 103 and may be analyzed by the latter to deduce therefrom characteristics of the scene. As an example, readout circuit 103 is capable of processing signal 203 by analog and/or digital filtering operations, to determine the transmission times or the signature of event indication signals 201 by the different pixels 101 of the device during an analysis phase, and thus reconstruct an image of the scene seen by the device. As a variation, readout circuit 103 does not determine the positions of pixels 101 transmitting event indication signals 201 during the analysis phase, but only counts the number of events detected during predetermined time periods of the analysis phase, to construct a histogram characteristic of the scene. The patterns of the different event indication signals 201 are preferably non-correlated or lightly correlated, to ease the extraction of the desired information from signal 203, particularly when a high number of pixels 101 turn on at the same time or within a short time interval. Event indication signals 201 may have varied shapes selected according to the needs of the application and/or according to the nature or modality of the signals (current, voltage, or charges). As an example, event indication signals 201 may be square pulses having different widths and/or amplitudes. As a variation, event indication signals 201 may be stepped pulses having properties specific to the different pixels. As a variation, event indication signals 201 may be pulse trains where the spacing and/or the number of pulses carries information relative to the position of the pixel. As a variation, event indication signals 201 may be oscillations having phase, frequency, and/or amplitude properties specific to the different pixels, for example, square-wave oscillations, for example, generated by a ring oscillator. As a variation, pulse signals 201 having shapes of dyadic wavelet window, Gaussian, raised cosine type, etc. As a variation, event indication signals 201 may be provided in the form of binary patterns of the type currently used in the field of telecommunications such as Gold sequences.

According to a second example of operation, the event indication signals 201 transmitted by the different pixels 101 on conductive track 105 have identical or similar shapes. In this case, readout circuit 103 cannot determine the origin of the pixels transmitting signals 201, and thus cannot reconstruct an image of the scene from signal 203. However, circuit 103 may be configured to determine certain characteristics of the scene from signal 203, for example, by counting of the number of events signaled by pixels 101. As an example, circuit 103 counts the number of events detected during predetermined time periods of an analysis phase, to construct a histogram characteristic of the scene. Event indication signals 201 are then preferably current pulses capable of adding on conductive track 105. This enables readout circuit 103 to determine at any time, by current intensity measurements from conductive track 105, the exact number of event signaled by the pixels, including when a plurality of pixels simultaneously signal event detections.

As a variation, in the first and/or second above-mentioned examples of operation, each pixel 101 may be capable of detecting a plurality of different events, for example, the passing of a threshold for the voltage across its photodiode and the passing of a threshold of time difference between the time taken by the pixel to turn on during an integration phase and the time taken by the same pixel to turn on during a previous integration phase. Each pixel 101 can then be configured to transmit on conductive track 105 different event indication signals when it detects occurrences of different events. Readout circuit 103 is then capable of identifying the different events based on the signal 203 received on conductive track 105. As an example, each pixel may be capable of detecting that light intensity (or turn-on) thresholds have been passed in a plurality of different colors or illumination wavelength ranges, and of transmitting on conductive track 105 event indication signals having different shapes to signal the occurrence of a turning on in the different colors that it monitors. Such an operating mode is particularly advantageous for multispectral imaging applications. For a given color, all the sensor pixels may have the same signature, or different signatures.

Figure 3:
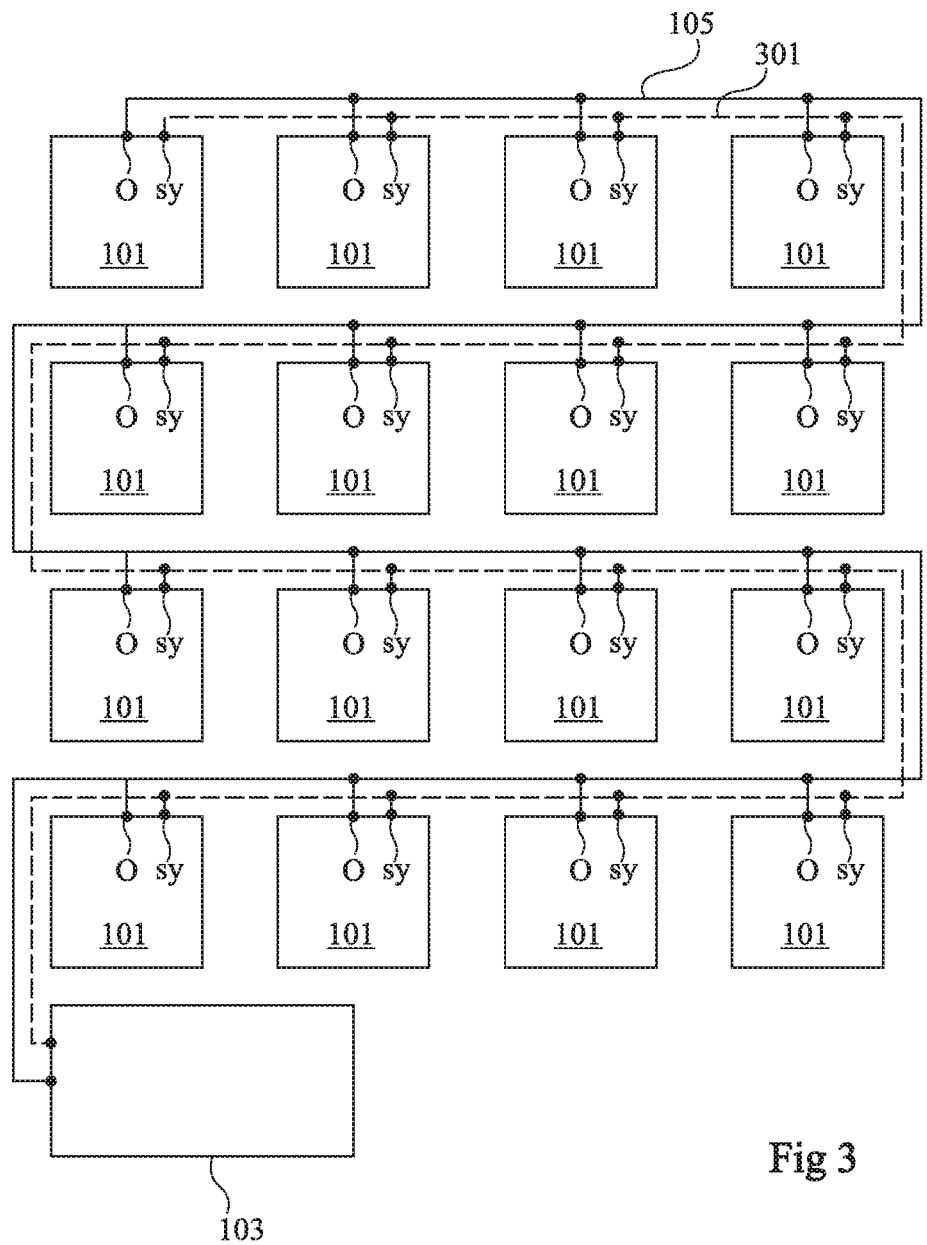
FIG. 3 is a simplified electric diagram of an example of an electronic device for analyzing a scene according to a second embodiment.

FIG. 3 is a simplified electric diagram of an example of an electronic device for analyzing a scene according to a second embodiment. The device of FIG. 3 comprises the same elements as the device of FIG. 1, arranged substantially in the same way, and further comprises a second conductive track 301 different from conductive track 105 (that is, not connected to track 105), connecting pixels 101 to readout circuit 103. Conductive track 301 is intended to transport a synchronization signal (possibly managed asynchronously) easing the demodulation, by the readout circuit 103, of signal 203 read from track 105. In the example of FIG. 3, each pixel 101 comprises, in addition to its output node o, a synchronization node sy connected to conductive track 301.

Figure 4:
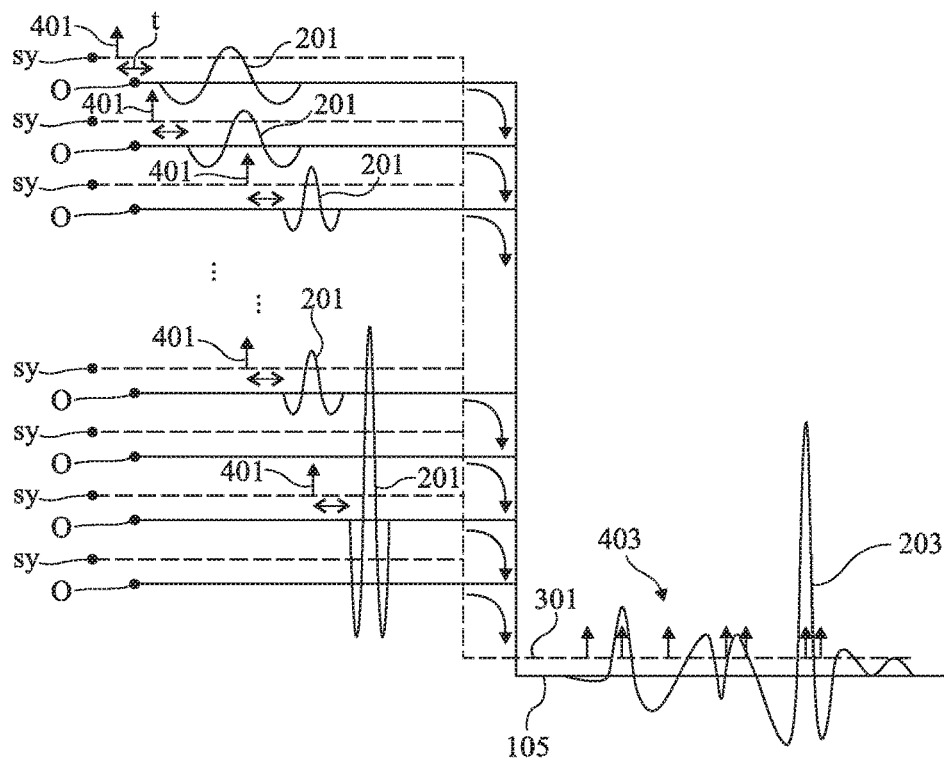
FIG. 4 schematically illustrates an example of an operating mode of the device of FIG. 3.

FIG. 4 schematically illustrates an example of an operating mode of the device of FIG. 3. FIG. 4 shows, arranged in a column, the output nodes o and the synchronization nodes sy of the different pixels 101 of the device, as well as conductive tracks 105 and 301 connecting pixels 101 to readout circuit 103.

The operating mode of FIG. 4 differs from the operating mode described in relation with FIG. 2 mainly in that, in the example of FIG. 4, each pixel 101 is configured to, when it detects an occurrence of an event that it monitors, not only transmit on conductive track 105, via its output node o, an event indication signal 201, but further transmit on conductive track 301, via its synchronization node sy, a synchronization pulse 401. Synchronization pulses 401 preferably have a duration shorter than the duration of event indication pulses 201, to limit risks of collision in case of detections of simultaneous events by a plurality of pixels of the device. Synchronization pulses 401 are for example current, voltage, or charge pulses. The synchronization pulses 401 transmitted by the different pixels 101 of the device may be identical or similar. Synchronization pulses 401 are for example Dirac-type pulses. As an example, when a pixel detects an occurrence of an event that it monitors, it first transmits a synchronization pulse 401 on conductive track 301 and then, after a predetermined time interval t identical for all the device pixels, an event indication signal 201 on conductive track 105. Synchronization signal 403 transmitted on conductive track 301, corresponding to the sequence of the synchronization pulses 401 transmitted by pixels 101, is read by readout circuit 103. Signal 401 enables to ease the operations of demodulation of signal 203 by readout circuit 103. More particularly, signal 403 is used by readout circuit 103 to synchronize the operations of decoding of the signal 203 read from conductive track 105.

Figure 5:
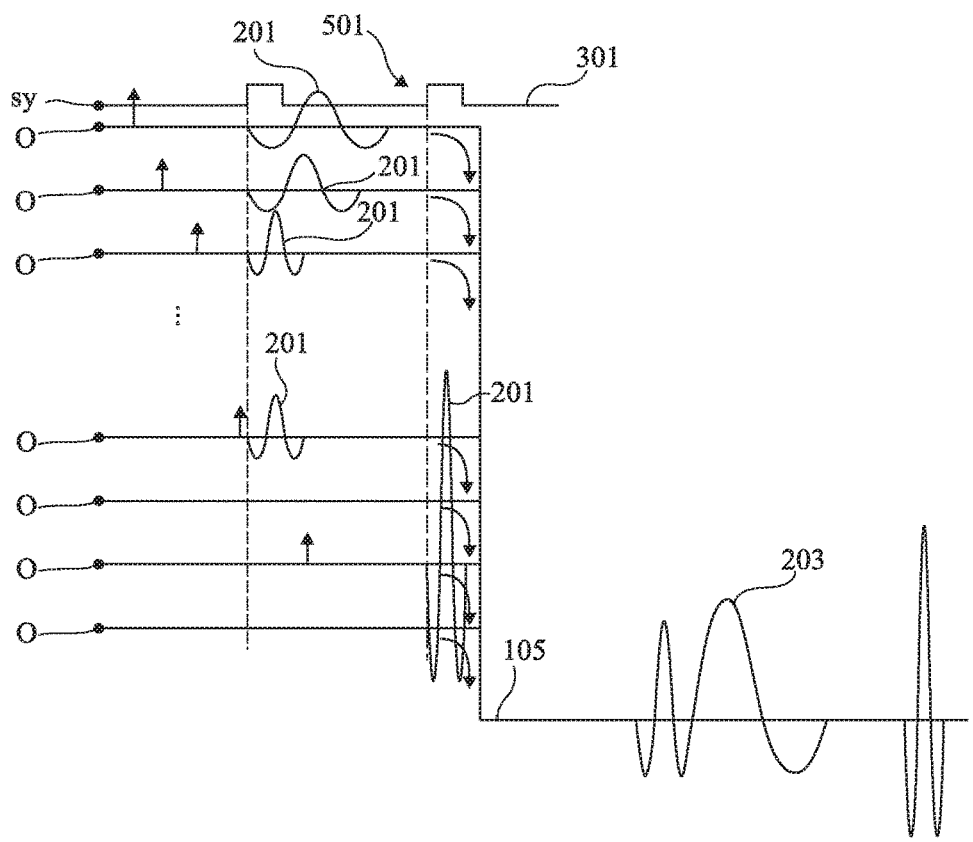
FIG. 5 schematically illustrates an example of another operating mode of the device of FIG. 3.

FIG. 5 schematically illustrates another example of an operating mode of the device of FIG. 3. FIG. 5 shows the output nodes o of the different pixels 101 of the device, arranged in a column, as well as conductive track 105 connecting pixels 101 to readout circuit 103. A periodic synchronization signal 501, for example, a clock signal, applied by readout circuit 103, via conductive track 301, to the synchronization nodes sy of the different pixels 101 of the device, has further been shown. The operating mode of FIG. 5 differs from the operating mode described in relation with FIG. 2 essentially in that, in the example of FIG. 5, each pixel 101 is configured to, when it detects an occurrence of an event that is monitors (the times of occurrence of events are represented by vertical arrows in FIG. 5), instead of directly transmitting an event indication signal 201 on its output node o as in the example of FIG. 2, wait for a next rising or falling edge (a rising edge in the shown example) of synchronization signal 501 to transmit event indication signal 201. Thus, all the pixels 101 having detected events between two successive synchronization edges of signal 501 transmit their event indication signals 201 substantially at the same time. The operating mode of FIG. 5 enables to ease the event counting by readout circuit 103 and is particularly adapted to the forming of histograms characteristic of the scene. As an example, synchronization signal 501 may be selected so that the time intervals between two successive synchronization edges of signal 501 correspond to the widths of the classes of the histogram which is desired to be established. It should be noted that signal 501 may be non-periodic, that is, that it may exhibit a variable time interval between two successive synchronization edges, for example, to form a histogram having classes of different widths. In the embodiment of FIG. 5, event indication signals 201 are preferably current pulses capable of adding on conductive track 105, which enables readout circuit 103 to determine at any time, by current intensity measurements on conductive track 105, the number of event signaled by the pixels, including when a plurality of pixels simultaneously signal event detections.

Figure 6:
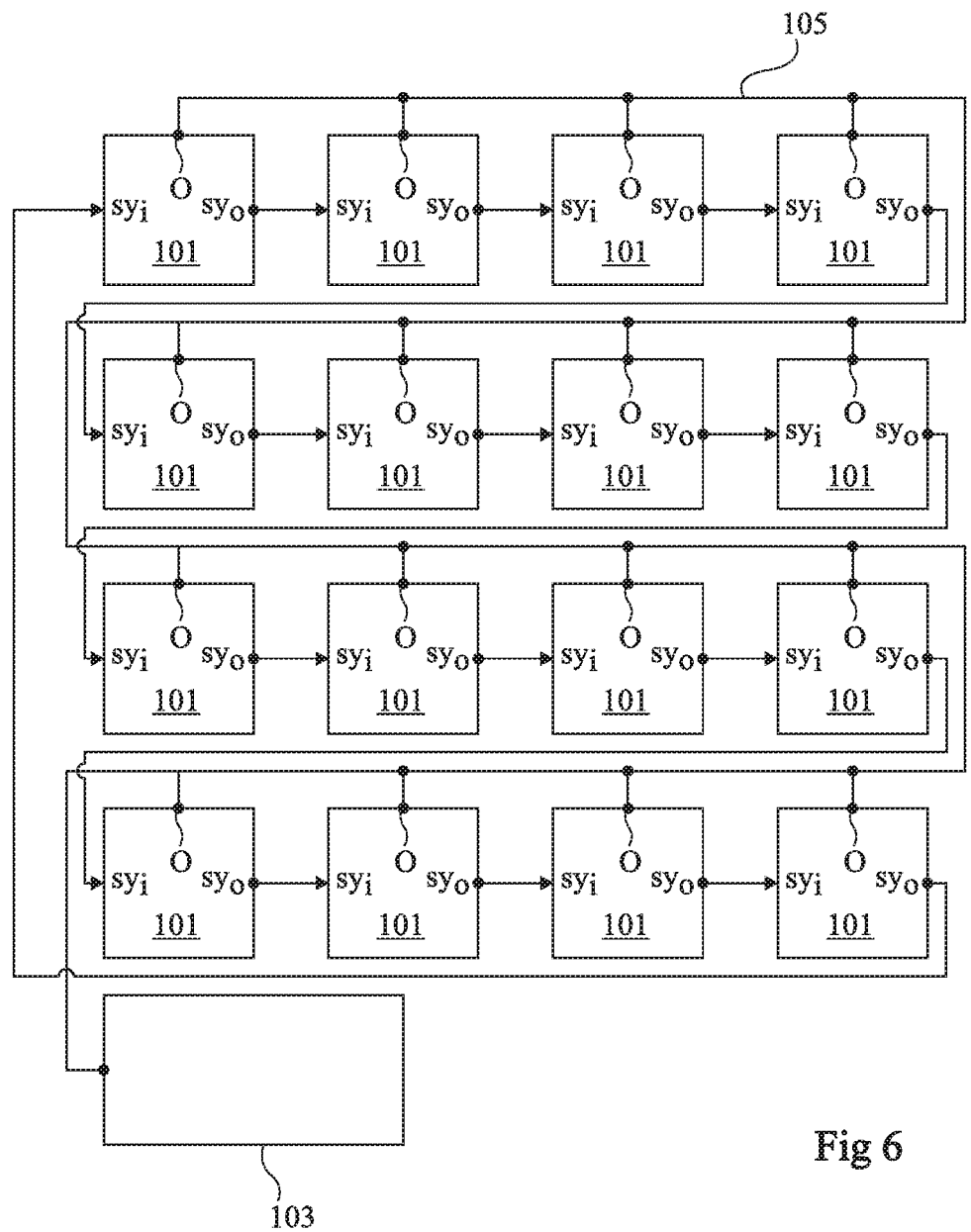
FIG. 6 is a simplified electric diagram of an example of an electronic device for analyzing a scene according to a third embodiment.

FIG. 6 is a simplified electric diagram of an example of an electronic device for analyzing a scene according to a third embodiment. The device of FIG. 6 comprises the same elements as the device of FIG. 1, arranged substantially in the same way. In the example of FIG. 6, each pixel 101 further comprises a synchronization signal receive node $sy_i$ and a synchronization signal supply node $sy_o$. Pixels 101 are connected in a chain closed via their synchronization nodes $sy_i$ and $sy_o$, so that each pixel 101 has its node $sy_i$ connected to the node $sy_o$ of a single other pixel 101 of the device.

Figure 7:
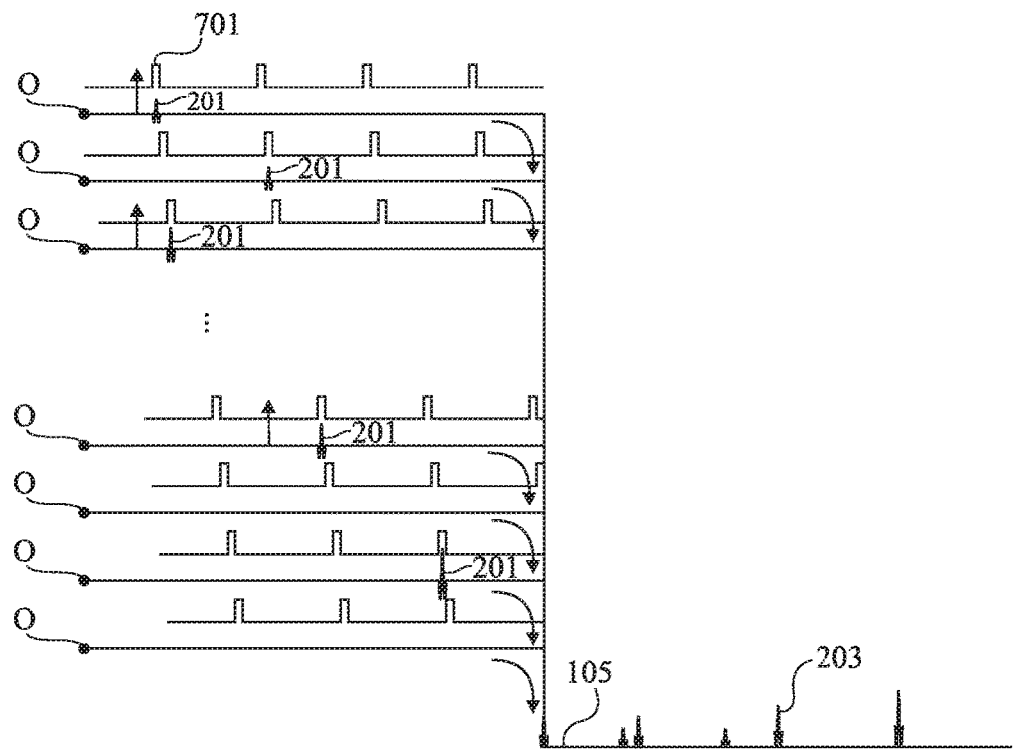
FIG. 7 schematically illustrates an example of an operating mode of the device of FIG. 6.

FIG. 7 schematically illustrates an example of an operating mode of the device of FIG. 6. FIG. 7 shows, arranged in a column, the output nodes o of the different pixels 101 of the device, as well as conductive track 105 connecting pixels 101 to readout circuit 103. A token signal 701, for example, a voltage, current, or charge pulse, crossing one by one of the pixels of the device via nodes $sy_i$ and $sy_o$ of the pixels, has further been shown. As an example, when a pixel receives token signal 701 on its node $sy_i$, it copies it on its node $sy_o$, to transmit it to the next pixel in the chain, so that, at any time, only a single pixel 101 of the chain is in possession of the token. Token 701 for example permanently circulates in the chain of pixels 101 during a phase of analysis of the scene by the device. The operating mode of FIG. 7 differs from the operating mode described in relation with FIG. 2 essentially in that, in the example of FIG. 7, each pixel 101 is configured to, when it detects an occurrence of an event that it monitors (the times of occurrence of events are represented by vertical arrows in FIG. 7), instead of immediately transmitting an event indication signal 201 on its output node o as in the example of FIG. 2, wait for a next crossing of the pixel by synchronization token 701 to transmit event indication signal 201. Thus, in the embodiment of FIG. 7, at a given time, only one pixel 101 is capable of transmitting on conductive track 105, which enables to ease the decoding of signal 203 by readout circuit 103. As an example, the event indication signals 201 transmitted by the pixels may have the same general shape, for example, a Dirac or square pulse shape, but with different amplitudes corresponding to different pixel positions and/or to different types of events. As a variation, the starting of the circulation of token 701 in pixel chain 101 during an analysis phase may be triggered only after the detection of a first event by one of pixels 101. This advantageously enables to limit the power consumption of the device due to the circulation of token 701 at the beginning of the analysis, when no event has occurred yet.

It should be noted that in the operating mode of FIG. 7, the pixels may advantageously be permanently set to standby, and only woken up each time they are crossed by the token. Each time it is woken up, the pixel can then verify whether an occurrence of an event has taken place during the previous standby phase, and accordingly decide whether to transmit or not an event indication signal. This enables to significantly limit the circuit power consumption. In particular, in the case where each pixel comprises a comparator capable of comparing a quantity representative of its illumination level with a threshold, the comparator may be set to standby between two passages of the token.

Figure 8:
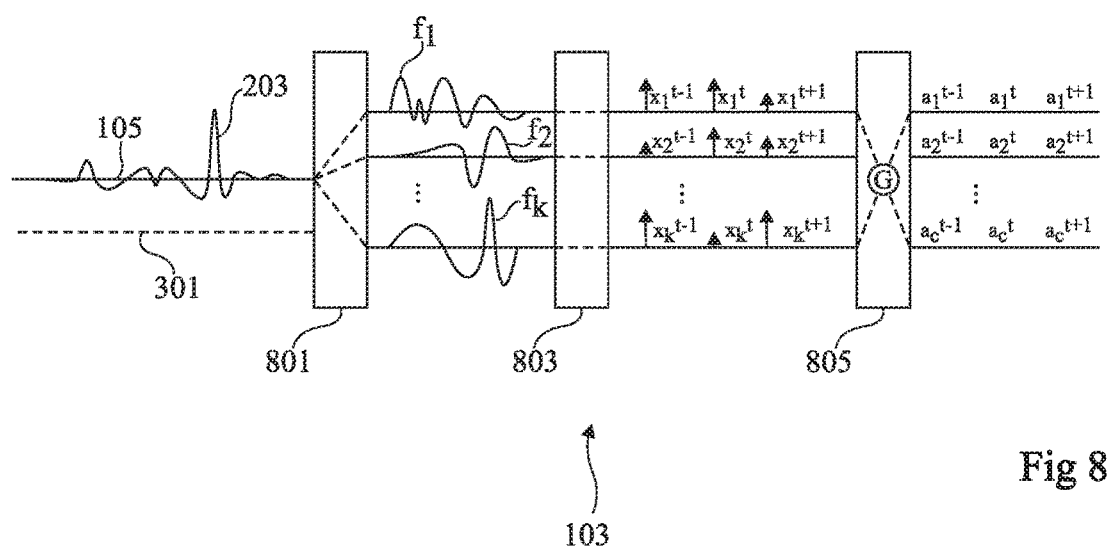
FIG. 8 schematically illustrates the operation of a readout circuit of an electronic device of analysis of a scene according to an embodiment.

FIG. 8 schematically shows in the form of functional blocks an embodiment of the readout circuit 103 of an electronic device for analyzing a scene of the type described in relation with FIGS. 1 to 7.

In this example, circuit 103 comprises a filtering block 801 comprising a bank of k filters (not detailed) having different filtering properties, k being an integer greater than 1. Filtering block 801 receives as an input the data signal 203 supplied on the data output conductive track 105 of the pixels, which may be accompanied (embodiment of FIG. 3) by the synchronization signal supplied on the conductive synchronization track 301 of the pixels. Block 801 supplies, respectively, on k different output tracks, k signals $f_1, f_2, \ldots f_k$, corresponding to the output signals of the different filters in the bank.

Circuit 103 of FIG. 8 further comprises a power estimation block 803. Block 803 receives, respectively on k different input paths, the k output signals $f_1, f_2, \ldots f_k$ of filtering block 801. Block 803 supplies, for each input signal fi, i being an integer in the range from 1 to k, an output signal xi discretized in the time domain, representative of the power of input signal $f_i$, and, possibly (embodiment of FIG. 3), synchronized by means of the signal supplied on conductive synchronization track 301 of the pixels. More particularly, for each input signal $f_i$, each sample $x_i^t$ of the output signal $x_i$ is representative of the power of input signal $f_i$, integrated in the time interval ranging from t-1 to t, where t is the discretized time variable. In the shown example, block 803 comprises k different output tracks respectively supplying the k output signals $x_1, x_2, \ldots x_k$.

Circuit 103 of FIG. 8 further comprises a block 805 of transformation of the output power signals $x_i$ of the different filters by an analysis operator G enabling to trace back information contained in the scene, and more particularly the number of event indication signals 201 of each type (each type of signal corresponding to a signature searched for in input signal 203, and to the bandwidth of one of the filters of filter bank 801) contained in input signal 203 at each time (or time interval) t. As an example, block 805 may perform an array multiplication by means of analysis operator G. The array operation enables to generate an array A of c rows and l columns resulting from the multiplication of X, formed of k rows and l columns, by G, where array X comprises, in each row of rank i, a sequence of l successive output values $x_i^t$ of signal $x_i$. Array A comprises, in each row of rank i, a sequence of l successive output values $a_i^t$ of an output signal $a_i$. More particularly, each sample $a_i^t$ of output signal a, is representative of the number of events of type i in the time interval ranging from t-1 to t, where t is the discretized time variable. As an example, array G is the pseudo-inverse of an array representation G+ of the powers associated with the outputs of the filter bank for patterns generated by the different types of searched event indication signals. Array G+ for example is an array of k rows and l columns, comprising, in each column of rank i, a sequence of k successive values $m_i^t$ representing the powers associated with the output of the filter bank for an elementary pattern of one of the c types of searched event indication signals. In the shown example, block 805 comprises c different output tracks respectively supplying the c output signals $a_1, a_2, \ldots a_c$.

Specific embodiments have been described. Various alterations and modifications will occur to those skilled in the art. In particular, although only examples of analysis devices where all the pixels 101 of the device are connected by a same conductive track 105 to readout circuit 103 have been shown, the described embodiments are not limited to this specific case. As a variation, pixels 101 may be distributed in a plurality of groups of a plurality of pixels each, the pixels of each group being connected to readout circuit 103 by a same conductive track 105 and the pixels of different groups being connected to readout circuit 103 by different conductive tracks 105. The pixels of each group may further possibly be connected to readout circuit 103 by a same synchronization conductive track 301 (embodiment of FIG. 3) or form a closed chain adapted to the circulation of a synchronization token 701 (embodiment of FIG. 6). As an example, the pixels 101 of the device are arranged in an array of rows and columns, the different pixel groups corresponding to the different pixel rows or to the different pixel columns of the array.

What is claimed is:

1. An electronic device for analyzing a scene, comprising a plurality of pixels connected to a readout circuit by a same first conductive track, wherein:
    each pixel is capable of detecting an occurrence of a first event characteristic of the scene and of transmitting an event indication signal on the first conductive track when it detects an occurrence of the first event; and
    the readout circuit is capable of reading from the first conductive track the event indication signals transmitted by the pixels, and of deducing therefrom characteristics of the scene, without transmitting event acknowledgement signals to the pixels,
    and wherein each pixel further comprises a first synchronization node, each pixel being configured to, when it detects an occurrence of the first event, wait to receive a synchronization signal on its first synchronization node to transmit the event indication signal on the first conductive track, or transmit a synchronization signal via its first synchronization node before transmitting the event indication signal on the first conductive track.

2. The device of claim 1, wherein the pixels are connected to the readout circuit by a second conductive track, via their first synchronization node.

3. The device of claim 2, wherein each pixel is capable, when it detects an occurrence of the first event, of:
    transmitting the synchronization signal on the second conductive track; and then
    after a predetermined time interval, transmitting the event indication signal on the first conductive track.

4. The device of claim 3, wherein the duration of the synchronization signal is shorter than the duration of the event indication signals.

5. The device of claim 3, wherein the synchronization signals are read by the readout circuit from the second conductive track and are used by the readout circuit to synchronize operations of decoding of the event indication signals read from the first conductive track.

6. The device of claim 2, wherein the readout circuit is capable of applying on the second conductive track the synchronization signal in the form of a succession of synchronization edges, and wherein each pixel is capable, when it detects an occurrence of the first event, of waiting for a next synchronization edge of the synchronization signal and then, on reception of this edge, of transmitting the event indication signal on the first conductive track.

7. The device of claim 1, wherein each pixel further comprises a second synchronization node, the pixels being connected in a chain closed by their first and second synchronization nodes, the pixels being capable of circulating the synchronization signal in the form of a synchronization token in the chain during a phase of analysis of a scene, so that, at any time, a single pixel of the chain is in possession of the synchronization token.

8. The device of claim 7, wherein each pixel is capable, when it detects an occurrence of the first event, of waiting to receive the synchronization token, and then, on reception of the token, of transmitting the event indication signal on the first conductive track.

9. The device of claim 7, wherein the starting of the circulation of the token in the pixel chain during an analysis phase is triggered by the detection of a first event by a pixel of the device.

10. The device of claim 1, wherein the readout circuit is capable, based on the signal read from the first conductive track, of detecting all the events signaled by the pixels, including when a plurality of pixels simultaneously transmit an event indication signal on the first conductive track.

11. The device of claim 10, wherein different pixels are capable of transmitting on the first conductive track current or voltage event indication signals having different shapes when they detect an occurrence of the first event.

12. The device of claim 11, wherein the readout circuit is capable of analyzing the shapes of the event indication signals read from the first conductive track, and of deducing therefrom the positions of the pixels having transmitted these signals to reconstruct an image of the scene.

13. The device of claim 10, wherein the event indication signals transmitted on the first conductive track by the different pixels when they detect an occurrence of the first event are current signals having the same shape.

14. The device of claim 1, comprising pixels of different natures capable of detecting events of different natures, the event indication signals transmitted by the pixels having the same shape for pixels of same nature and different shapes for pixels of different natures.

15. The device of claim 1, wherein the readout circuit is capable of counting the event indication signals read from the first conductive track during predetermined time periods of an analysis phase, to construct a histogram characteristic of the scene.

16. The device of claim 1, wherein each pixel is further capable of detecting an occurrence of a second event characteristic of the scene and, when it detects an occurrence of the second event, of transmitting on the first conductive track an event indication signal different from the event indication signal that it transmits when it detects an occurrence of the first event.

17. An electronic device for analyzing a scene, comprising a plurality of pixels connected to a readout circuit by a same first conductive track, wherein:
    each pixel is capable of detecting an occurrence of a first event characteristic of the scene and of transmitting an event indication signal on the first conductive track when it detects an occurrence of the first event; and
    the readout circuit is capable of reading from the first conductive track the event indication signals transmitted by the pixels, and of deducing therefrom characteristics of the scene, without transmitting event acknowledgement signals to the pixels,
    and wherein the readout circuit is capable, based on the signal read from the first conductive track, of detecting all the events signaled by the pixels, including when a plurality of pixels simultaneously transmit an event indication signal on the first conductive track.

18. The device of claim 17, wherein different pixels are capable of transmitting on the first conductive track current or voltage event indication signals having different shapes when they detect an occurrence of the first event.

19. The device of claim 18, wherein the readout circuit is capable of analyzing the shapes of the event indication signals read from the first conductive track, and of deducing therefrom the positions of the pixels having transmitted these signals to reconstruct an image of the scene.

20. The device of claim 17, wherein the event indication signals transmitted on the first conductive track by the different pixels when they detect an occurrence of the first event are current signals having the same shape.

* * * * *